United States Patent Office 3,480,438
Patented Nov. 25, 1969

3,480,438
PHOTOGRAPHIC MATERIALS FOR THE SILVER DYE-BLEACH PROCESS
Karl-Heinz Freytag, Leverkusen-Steinbuchel, Carl Taube, Leverkusen, and Bernhard Seidel, Cologne-Mulheim, Germany, assignors to Agfa-Gevaert Aktiengesellschaft, Leverkusen, Germany, a corporation of Germany
No Drawing. Filed July 14, 1965, Ser. No. 472,052
Claims priority, application Germany, Aug. 14, 1964, A 46,856
Int. Cl. G03c 1/10, 5/52
U.S. Cl. 96—99    6 Claims

ABSTRACT OF THE DISCLOSURE

Azo dyes for the silver dye-bleach process having the formula

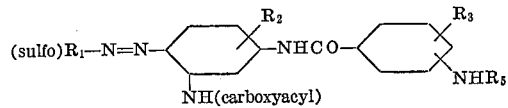

as defined below, are particularly readily bleached out in the processing.

---

The present invention relates to the silver dye-bleach process, and particularly to azo dyes for such process.

In the silver dye-bleach process an azo dye is bleached in accordance with a photographic silver image, to produce a dye image of the original. For a positive dye image conventional black-and-white development is used to first provide a negative silver image. Since the dye homogenously distributed in the layer is destroyed in proportion to the silver image, a final positive dye image is obtained.

If the process is performed in such a way that primarily a positive silver image is first obtained, for example by a black-and-white reversal development or by the so-called bromide ion diffusion process, a dye image is produced which is negative with respect to the original.

It is among the objects of the present invention to provide photographic materials for the silver-dye-bleach process, which materials contain azo dyes with improved properties.

The standards which must be met by dyes for the process described are particularly high, since the dyes must not only be spectrally suitable, but they should also have a good bleaching capacity as well as high light fastness. In addition, they should not have any deleterious effect on the photographic emulsion and must be completely fast to diffusion.

We now have found that the requirements for a dye for the silver dye-bleach process are met in excellent manner by azo dyes of the following formula

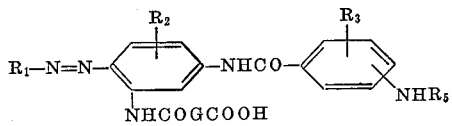

wherein:

$R_1$ = a group of the benzene or naphthalene series which is substituted with at least one sulfo group, preferred are sulfophenyl or sulfonaphthyl;

$R_2$ = hydrogen, alkyl with preferably up to 6 carbon atoms, alkoxy with preferably up to 6 carbon atoms, hydroxy substituted alkyl having preferably up to 6 carbon atoms and halogen such as chlorine or bromine;

$R_3$ = hydrogen, alkyl with preferably up to 6 carbon atoms, alkoxy with preferably up to 6 carbon atoms, hydroxy substituted alkyl having preferably up to 6 carbon atoms and halogen such as chlorine or bromine;

G = phenylene or saturated or olefinically unsaturated alkylene having up to 10 carbons;

$R_5$ = acyl derived from an aliphatic or aromatic carboxylic acid such as an acid of the benzene or naphthalene series or from carbonic acid or from a derivative thereof such as carbamic acid. Preferred are acyl groups containing a phenyl or a naphthyl group, in particular N-phenylcarbamyl or benzoyl, the phenyl ring of which can be substituted with alkyl of up to 5 carbon atoms, alkoxy, halogen such as chlorine or bromine and the like. Preferred are further N-alkyl carbamyl, the alkyl group of which has up to 5 carbon atoms which can be substituted for example with alkoxy, halogen such as chlorine or bromine and the like. $R_5$ can further stand for an azo grouping of the following formula:

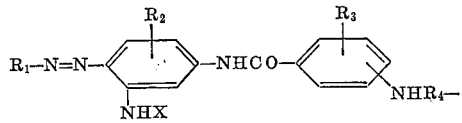

wherein $R_1$, $R_2$, $R_3$ and X having the meanings identified above and wherein $R_4$ represents keto or a bivalent acyl group derived from a saturated or olefinically unsaturated aliphatic or aromatic dicarboxylic acid such as dicarboxylic acids of the benzene and naphthalene series, preferably a saturated or unsaturated aliphatic dicarboxylic acid having up to 6 carbon atoms such as —CO.CH=CH.CO— or a benzene dicarboxylic acid.

The azo dyes of the invention are characterized by the grouping —NHX, which is an acylamino radical carrying carboxy groups. The substituent —NHR₅ can be attached to the benzene nucleus in the p-position or in the m-position.

Preferred are symmetrical bis-azo dyes of the following formula:

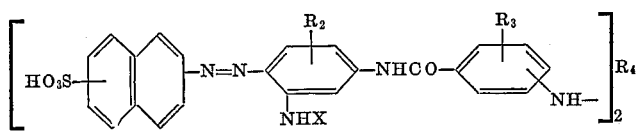

wherein $R_2$–$R_4$ and X have the meanings defined hereinbefore.
The following dyes have proved to be particularly advantageous:
I
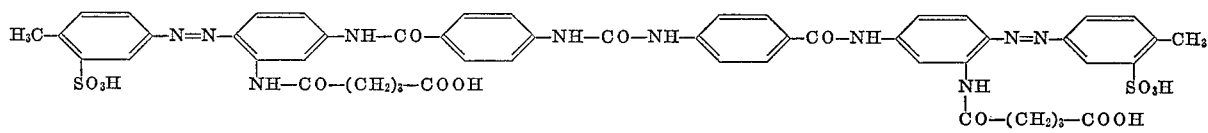
II
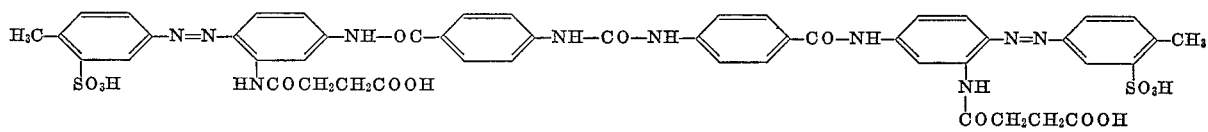
III
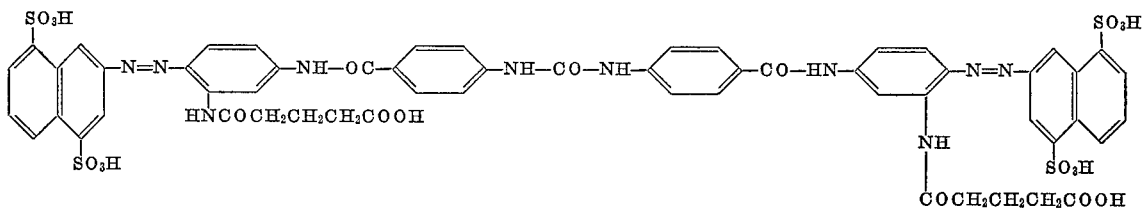
IV
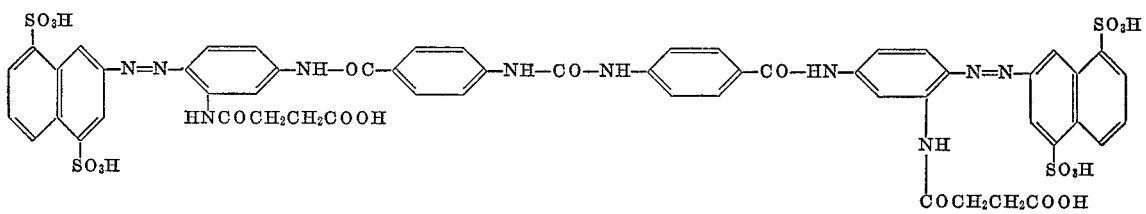
V
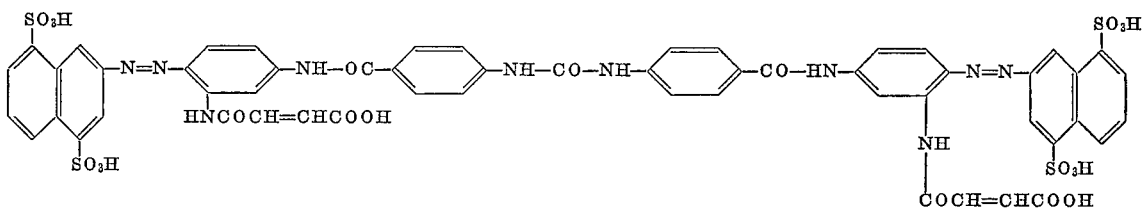
VI
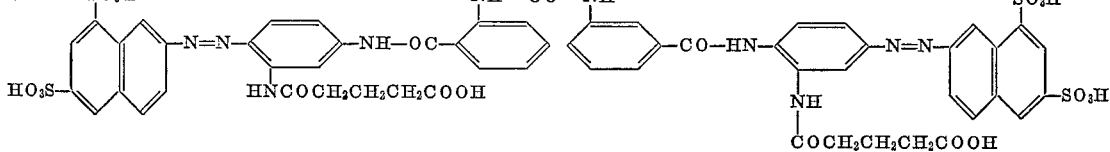
VII
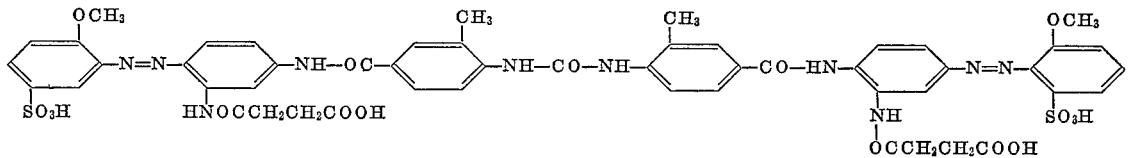
VIII
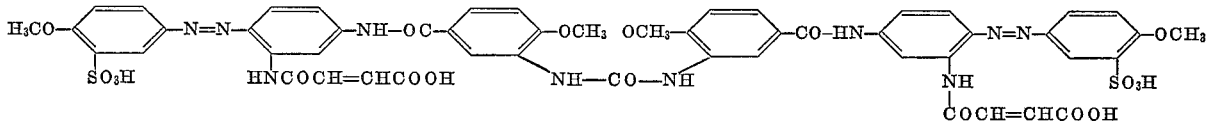
IX
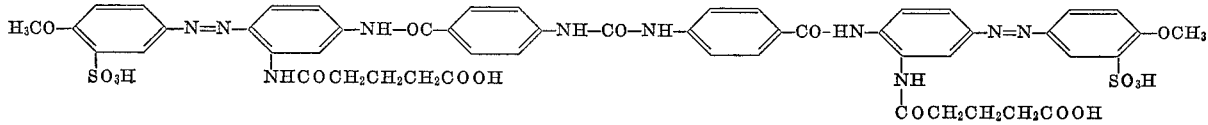

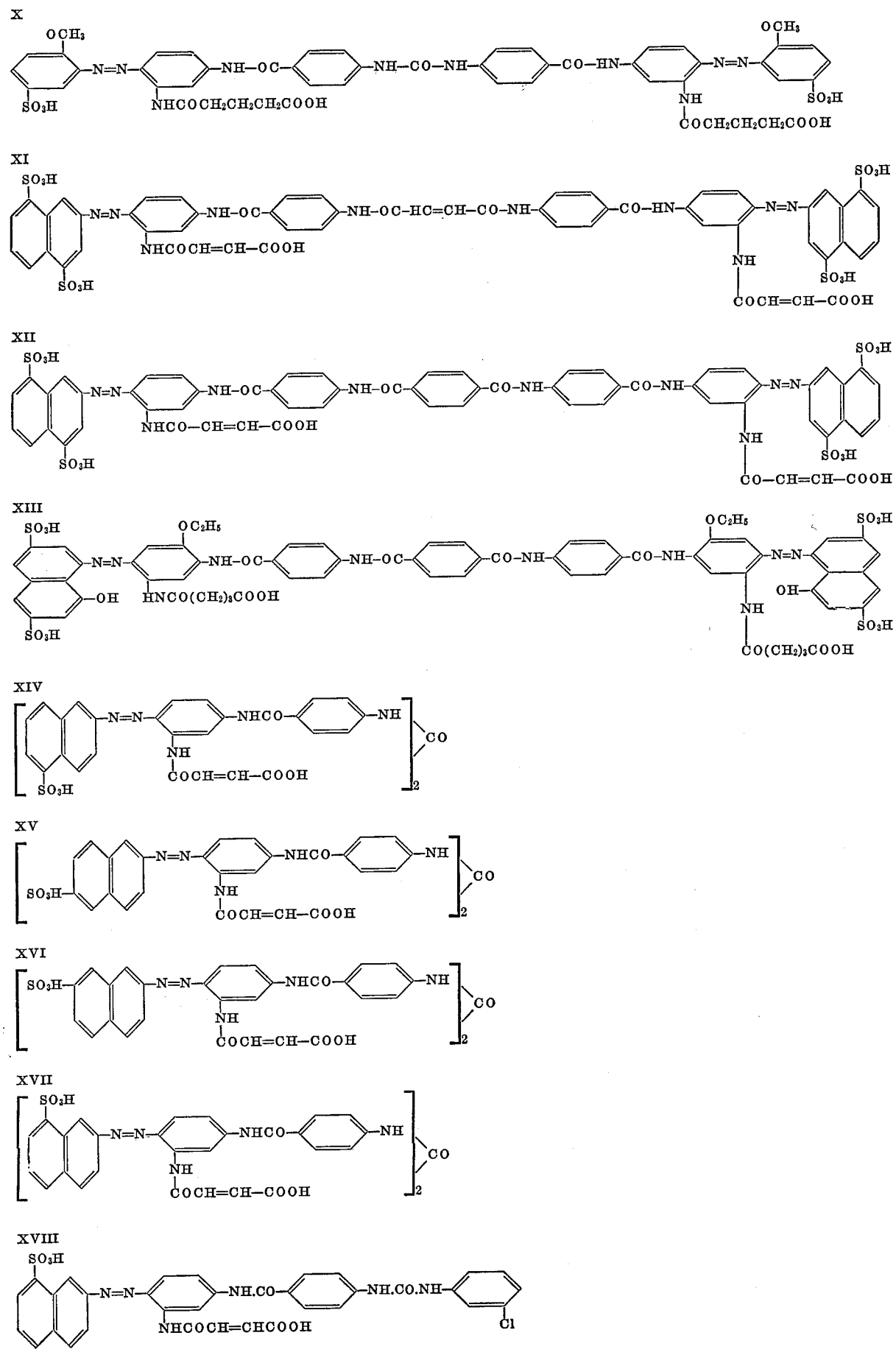

XIX
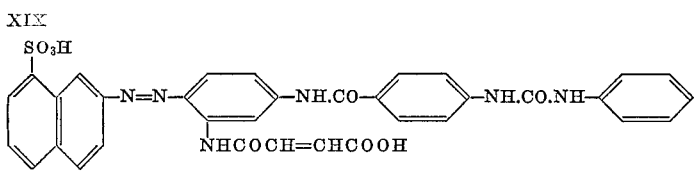

XX
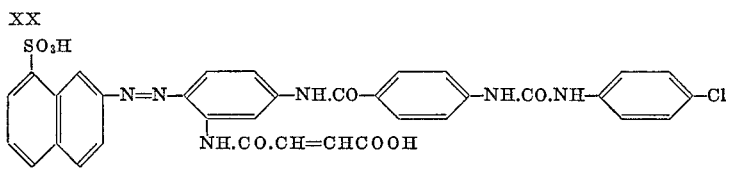

XXI
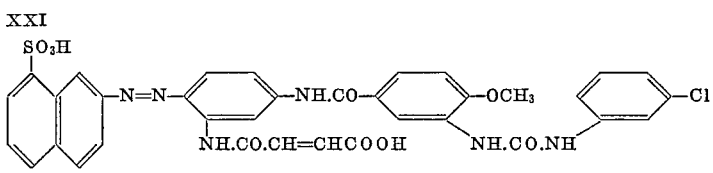

XXII
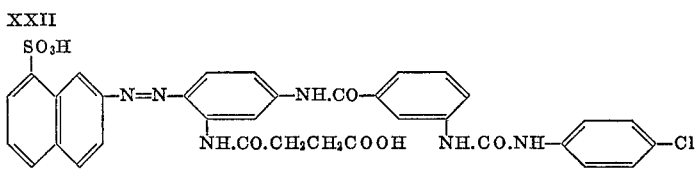

XXIII
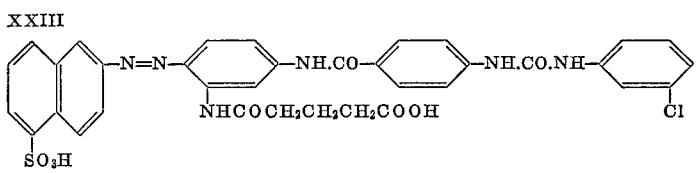

XXIV
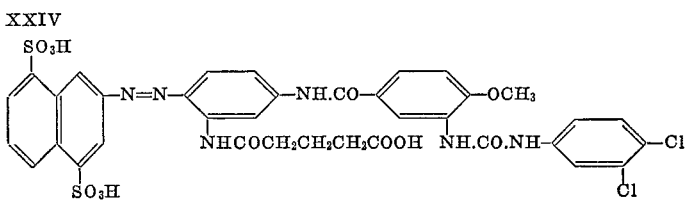

XXV
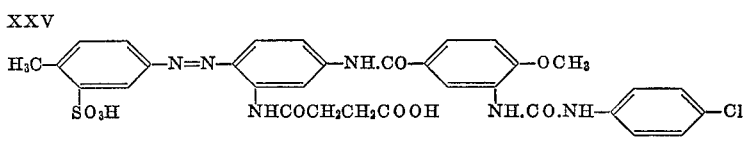

XXVI
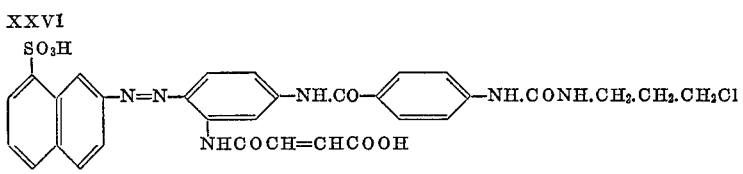

XXVII
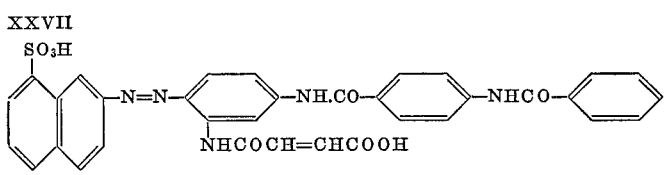

The dyes are prepared according to common practice. The preparation of some of the dyes is described in the following. The other dyes of the table are prepared in analogous manner.

DYE I 18.7 g. of 1-amino-4-methylbenzene-3-sulfonic acid are diazotized in the usual way and mixed with a solution of 22.2 g. of 1-amino-3-glutaroylaminobenzene in 14 ml. of concentrated hydrochloric acid and 300 ml. of water. 100 ml. of a 20% aqueous sodium acetate solution are then added dropwise and a yellow dye is formed. After completing the coupling, the reaction mixture is heated to 70° C. and 140 g. of common salt are added. The resulting precipitate is suction-filtered. The aminomonoazo dye is dissolved in 600 ml. of water, 100 ml. of a 20% aqueous sodium acetate solution are added and, at 40° C., a solution of 18.5 g. of 4-nitrobenzoyl chloride in 100 ml. of toluene is introduced dropwise. The resulting suspension is stirred until no diazotizable amino groups can any longer be detected. The suspension is then made alkaline with sodium carbonate and heated to 70° C. After adding 140 g. of common salt, the dye precipitates and is suction-filtered. The precipitate is dissolved again in 600 ml. of water and is reduced at 40° C. with a solution of 35 g. of sodium sulfide in 100 ml. of water in the usual way and isolated with acetic acid. The amino azo dye thus formed is reacted with phosgene to form a derivative of urea.

DYE II 18.7 g. of 1-amino-4-methylbenzene-3-sulfonic acid are diazotized in the usual way and mixed with a solution of 20.6 g. of 1-amino-3-maleinylaminobenzene in 14 ml. of concentrated hydrochloric acid, and 300 ml. of water. 100 ml. of a 20% by weight sodium acetate solution are then added dropwise and a yellow dye is formed. After completing the coupling, the amino azo dye is heated to 70° C. and 140 g. of common salt are added. The resulting precipitate is suction-filtered. Thereafter, the dye is dissolved in 600 ml. of water, 100 ml. of a 20% by weight sodium acetate solution are added and a solution of 18.5 g. of 4-nitrobenzoyl chloride in 100 ml. of methylbenzene is introduced dropwise at 40° C. The mixture is stirred until it is no longer possible to detect any diazotizable amino groups. The suspension is then made alkaline with sodium carbonate and heated to 70° C. After adding 140 g. of common salt, the dye precipitates and is filtered off with suction. The precipitate is dissolved in 600 ml. of water and is reduced in the usual way at 60° C. with a solution of 35 g. sodium sulfide in 100 ml. of water and isolated with acetic acid. The amino azo dye is reacted with phosgene to form a bisazo-substituted urea.

The half-amides of m-phenylene diamine and its derivatives, which are used in the above examples, can be prepared in the usual manner by reacting m-nitraniline and its derivatives with dicarboxylic acid anhydrides and subsequent reduction.

DYE XVII 24 g. of 2-aminonaphthalene-8-sulfonic acid are diazotized in the usual way and mixed with a solution of 22.2 g. of 1-amino-3-glutaroyl-aminobenzene in 14 ml. of concentrated aqueous hydrochloric acid and 300 ml. of water. Thereafter 100 ml. of a 20% aqueous sodium acetate solution are added to the resulting reaction mixture. A solution of 18.5 g. of 4-nitrobenzoyl chloride in 100 ml. of toluene is then introduced dropwise at a temperature of 40° C. The resulting suspension is stirred until no diazotizable amino group can be detected. The suspension is made alkaline by addition of sodium carbonate and heated to 70° C. After adding of 140 g. of common salt, the dye precipitates and is suction filtered. The precipitate is dissolved in 600 ml. of water and is reduced at 40° C. with a solution of 35 g. of sodium sulfide in 100 ml. of water and isolated with acetic acid. The aminoazo dye thus formed is reacted with phosgene to form the corresponding urea derivative.

DYE XVIII 22.3 g. of 2-aminonaphthalene-8-sulfonic acid are diazotized in the usual way and mixed with a solution of 20.6 g. of 1-amino-3-maleinoyl amino benzene in 14 ml. of concentrated aqueous hydrochloric acid and 300 ml. of water. 100 ml. of a 20% aqueous sodium acetate solution are added dropwise and a yellow dye is formed. After completing the coupling, the reaction mixture is heated to 70° C. and the aminoazo dye is precipitated by addition of 100 g. of common salt and suction filtered. Thereafter the dye is dissolved in 600 ml. of water, 100 ml. of a 20% aqueous sodium acetate solution are added and at 40° C. a solution of 18.5 g. of 4-nitrobenzoyl chloride in 100 ml. of toluene is introduced dropwise. The mixture is stirred until no diazotizable amino group can be detected, then made alkaline with sodium carbonate, heated to 70° C. and the dye is precipitated by addition of 140 g. of common salt. The precipitate is suction filtered, redissolved in 600 ml. of water, reduced at 60° C. with a solution of 35 g. of sodium sulfide in 100 ml. of water, precipitated again by the addition of 120 g. of common salt and suction filtered. The precipitate is dissolved in 800 ml. of water at 40° C. and mixed with 15.3 g. of 3-chlorophenyl isocyanate. It is stirred until no diazotizable amino group can be detected. The dye XVIII is obtained as a yellow powder.

DYE XXVII

This compound is prepared in the same manner as dye XVIII, with the exception that the last step of the reaction is performed with benzoyl chloride instead of 3-chlorophenyl isocyanate.

A particular advantage of the azo dyes of the invention is that they are fast to diffusion and soluble in aqueous solvents. The dyes according to the invention are superior to those described in German patent specification 1,148,886, because they are able to be bleached particularly easily. Furthermore, since the dyes can be bleached out completely, outstanding whites are obtained in the color images.

On account of their excellent properties, the dyes of the present invention can be used in various ways in color photographic layers for the silver dye-bleach process. As will be shown by the following examples, they are preferably used as dyes in photographic layers for the production of direct positive dye images. However, it is also possible to apply the dyes for making negative dye images.

In addition, more especially reddish-yellow dyes of the type according to the invention, because of their excellent spectral properties, are also suitable as filter dyes for the silver dye-bleach process, in pre-exposed silver halide-containing intermediate layers, in which homogenously distributed silver is formed upon photographic development. The dyes are destroyed in the dye-bleach bath.

The dyes of the invention are fast to diffusion in gelatine layers and consequently no additional mordanting by bi-functional organic bases, as customarily employed, is necessary. Furthermore, they do not reduce the sensitivity of photographic silver halide emulsion layers and consequently permit a very extensive utilization of the sensitivity of the basic photographic silver halide emulsions.

They are also substantially inert with respect to the usual quantities of emulsion additives, such as stabilizers, softeners, wetting agents, hardeners, or other substances, for example, sensitizers, which may be added. As will be seen from the following examples, they can be bleached out in various types of bleaching baths to give pure whites. The image whites are also not discolored by exposure to light over long periods.

The silver halide emulsion layers in which the azo dyes of the invention are to be used can contain as silver halide, silver chloride, silver bromide or silver chlorobromide which may contain a small amount of silver iodide, preferably not more than 10 mol percent.

The type of silver halide that can be used includes any of those prepared with hydrophilic colloids that are known to be satisfactory for dispersing silver halides. These colloids comprise preferably gelatin which can be replaced at least partially with other hydrophilic colloids such as albumine, alginic acid and derivatives thereof such as salts in particular with alkali metals, esters or amides, carboxy-methylcellulose, synthetic resins such as polyvinyl alcohol, polyvinyl pyrrolidone and the like.

The concentration of the azo dye in the light-sensitive emulsion can vary widely according to the color density desired in the final image. The suitable and most economical concentration for any given emulsion will be apparent to those skilled in the art upon making the ordinary tests.

The photographic emulsion may be coated on any photographic support including paper, cellulose esters such as cellulose acetate, cellulose acetobutyrate, cellulose nitrate and the like, polystyrene, polyesters in particular polyethylene terephthalate, polycarbonates preferably of bisphenylolalkanes and the like.

Photographic silver halide emulsions containing the azo dyes of the invention can also contain such addenda as chemical sensitizers, e.g., sulfur sensitizers, noble metal compounds such as gold or palladium compounds as described, for example, by R. Koslowski, Z. wiss. phot. 46, 65–72 (1951).

The emulsions can further contain stabilizers such as mercury compounds, thiazoles, heterocyclic mercapto compounds, and azaindenes such as disclosed by Birr in Z. wiss. phot. 47, 2–28 (1952). The emulsions can also be optically sensitized with sensitizing dyes customarily employed in the art of emulsion making, such as cyanines and merocyanines as described, for example, by F. M. Hamer "The Cyanine Dyes and Related Compounds" published by Interscience Publishers (1964).

The emulsions can also be hardened by an suitable hardener such as formaldehyde, halogen substituted aliphatic acids such as mucobromic acid and the like.

The emulsion may contain a suitable gelatin plasticizer such as glycol, a dihydroxy alkane and pentaerythritol phosphoric acid esters as described in German Patent 1,185,811, and the like.

Example 1

4 g. of the dye XI are dissolved in 400 ml. of a 4% aqueous gelatin solution and added in the dark to 800 ml. of a melted silver bromide emulsion containing about 15 g. of silver as silver bromide which emulsion is stabilized in known manner by addition of 4-hydroxy-6-methyl-1,3,3a,7-tetraazaindene. After adding the usual quantities of hardeners, such as formaldehyde, and plasticizers, the emulsion is cast onto a support of barytacoated paper and dried. The resulting layer contains 0.6 to 0.9 g. of Ag/square meter as silver bromide.

A sample of this light-sensitive layer is exposed under a blue filter or with white light through a grey step wedge and thereafter processed as follows:

(1) Development for 5 minutes in a bath comprising:

| | Grams |
|---|---|
| p-Methylamino phenol | 1 |
| Hydroquinone | 3 |
| Anhydrous sodium sulfite | 13 |
| Potassium bromide | 1 |
| Anhydrous sodium carbonate | 26 |
| Water to make 1000 ml. | |

(2) Rinsing for 5 minutes.
(3) Fixing for 5 minutes in a bath comprising:

| | Grams |
|---|---|
| Crystallized sodium thiosulfate | 200 |
| Potassium metabisulfite | 20 |
| Water to make 1000 ml. | |

(4) Rinsing for 5 minutes.
(5) Hardening for 5 minutes in a bath comprising:
   30% aqueous solution of formaldehyde ___ml__ 100
   Sodium bicarbonate _____g__ 2
   Water to make 1000 ml.
(6) Rinsing for 5 minutes.
(7) Dye-bleaching for 15 minutes in a bath comprising:
   Thiourea _____g__ 28
   Potassium bromide _____g__ 18
   2-amino-3-hydroxyphenazine _____mg__ 3
   Concentrated aqueous hydrochloric acid __ml__ 400
   Water to make 1000 ml.
(8) Rinsing for 5 minutes.
(9) Combined bleaching and fixing for 10 minutes in a bath comprising:

| | Grams |
|---|---|
| Tetrasodium ethylene diamine tetraacetate | 26 |
| Sodium carbonate anhydrous | 24 |
| Ferric chloride | 15 |
| Sodium sulfite anhydrous | 13 |
| Sodium thiosulfate cryst. | 200 |
| Water to make 800 ml. | |

(10) Rinsing for 20 minutes.

After drying, an excellent yellow dye image of the step wedge of high brilliance with bright whites is obtained. It does not show any dye diffusion and has excellent fastness to light.

Example 2

A photographic material is prepared as described in Example 1 with the exception that 4 g. of dye III are used instead of dye XI, and that the emulsion is cast onto a support of cellulose triacetate.

After drying and exposure, the processing is as follows:

(1) Development for 5 minutes (Bath as in Example 1).
(2) Rinsing for 5 minutes.
(3) Fixing for 5 minutes (Bath as in Example 1).
(4) Rinsing for 5 minutes.
(5) Hardening for 5 minutes (Bath as in Example 1).
(6) Rinsing for 5 minutes.
(7) Dye-bleaching for 15 minutes in a bath comprising:
   Quinoline _____ml__ 80
   Potassium iodide _____g__ 10
   Concentrated sulfuric acid _____ml__ 75
   Sodium hypophosphite _____g__ 10
   Water to make 1000 ml.
(8) Rinsing for 5 minutes.
(9) Bleaching for 5 minutes in a bath comprising:
   Copper chloride _____g__ 25
   Concentrated aqueous hydrochloric acid __ml__ 5
   Water to make 1000 ml.
(10) Fixing for 10 minutes in a bath comprising:

| | Grams |
|---|---|
| Sodium thiosulfate cryst. | 200 |
| Potassium metabisulfite | 20 |
| Water to make 1000 ml. | |

(11) Rinsing for 20 minutes.

After drying, an excellent yellow image on a transparent support is obtained.

Similar results are obtained if the dye in the photographic material described hereinbefore is replaced with another dye of the above table.

Example 3

4 g. of the dye XII are dissolved in 400 ml. of an 8% by weight aqueous gelatin solution and 800 ml. of a preexposed melted silver bromide emulsion are added. After adding the usual casting aids, the emulsion is cast onto a support of pigmented, opaque cellulose triacetate and dried. The resulting layer contains 0.3 to 0.5 g. of Ag per square meter in the form of silver bromide.

After processing as described in Example 1, a completely transparent layer is obtained which shows practically no higher extinction than a pure gelatin layer. A layer produced as indicated can be used as a filter layer in color photographic three-layer material.

In order to reduce the quantity of the dye and to produce suitable spectral properties, the silver halide emulsion can also be wholly or partially replaced by a dispersion of silver in gelatin, e.g., the so-called silver-filter-yellow.

Example 4

A color photographic three-layer material of the following composition is prepared:

As lowermost layer, a panchromatically sensitized silver bromide emulsion (0.6 g. of Ag per square meter) is applied to a support of baryta-coated paper. The emulsion contains 4 g. of a dye of the formula

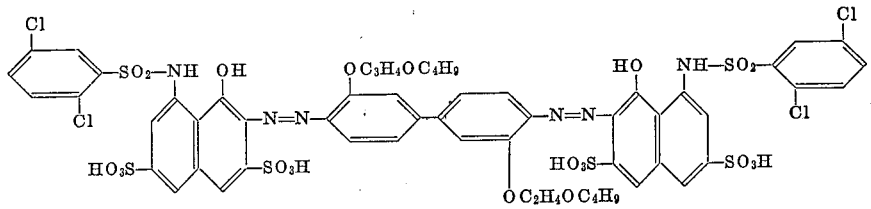

per kg. of emulsion; the preparation of this dyestuff is described in Example 1 of German Patent 1,041,355. Onto this layer is cast an orthochromatically sensitized silver bromide emulsion (0.7 g. of Ag per square meter), which contains 4 g. per kg. of the dye of the formula

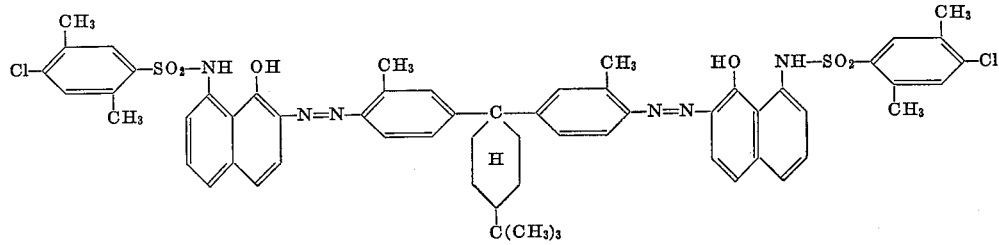

the preparation of which is described in Example 1 of German Patent 1,039,840. The latter layer is coated with another layer which contains 4.5 g. of the dye of Example 1 per kg. of a less sensitive silver bromide emulsion (0.7 g. of Ag per square meter).

After drying, the material is exposed through a color positive and it is processed as described in Example 2 with increased time in the dye-bleaching bath of about 25 minutes. A reproduction of the original in true colors is obtained after processing.

Example 5

A dye-containing silver halide gelatin emulsion layer is prepared with the same dye as in Example 1. It is exposed in a usual sensitometer through a grey step wedge with white light and processed as follows:

(1) First development for 5 minutes in a bath comprising:

|  | Grams |
|---|---|
| p-Methylaminophenol | 1 |
| Hydroquinone | 3 |
| Sodium sulfite anhydrous | 13 |
| Potassium bromide | 1 |
| Sodium carbonate anhydrous | 26 |
| Water to make 1000 ml. | |

(2) Rinsing for 1 minute.
(3) Bleaching for 1 minute in a bath comprising:
Potassium bichromate _____ g__ 10
Concentrated sulfuric acid _____ ml__ 5
Water to make 800 ml.
(4) Rinsing for 1 minute.
(5) Clarifying for 1 minute in sodium sulfite anhydrous 5 g. in 1000 ml. of water.
(6) Rinsing for 1 minute.

(7) Second exposure for 2½ minutes, 40 watt incandescent bulb, at a distance of 20 cm.
(8) Second development (as under 1).
(9) The further processing is in accordance with Example 1, steps 2–10.

A dye image of the same properties as in Example 1 is obtained, but with opposite gradation.

We claim:
1. Light-sensitive photographic material with at least one light-sensitive silver halide emulsion layer containing an effective amount of an azo dye of the following formula

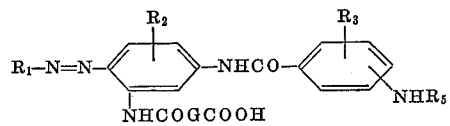

wherein
$R_1$ represents a group of the benzene or naphthalene series which is substituted with at least one sulfo radical;
$R_2$ and $R_3$ are hydrogen, alkyl, alkoxy, hydroxyalkyl, chlorine or bromine;
G represents phenylene or saturated or olefinically unsaturated alkylene having up to 10 carbons;
$R_5$ represents (1) an acyl group of an aliphatic carboxylic acids, aromatic carboxylic acids or carbamic acid or (2) an azo dye grouping of the formula

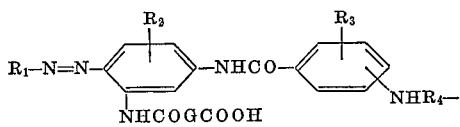

wherein $R_4$ stands for a carbonyl bridge or a bivalent acyl group of an aromatic dicarboxylic acid or a saturated or olefinically unsaturated aliphatic dicarboxylic acid.

2. Light-sensitive material as defined in claim 1, wherein the grouping —$NHR_5$ is attached to the benzene nucleus in m- or p-position with respect to the carbamyl group.

3. Light-sensitive material as defined in claim 2, wherein $R_5$ is an acyl group derived from a carbamic acid.

4. Light-sensitive material as defined in claim 1, wherein the azo dye has the following formula

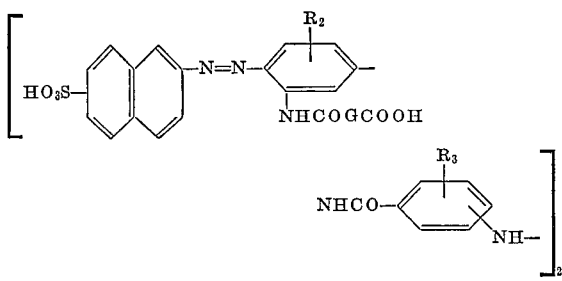

5. Light-sensitive material as defined in claim 1, wherein G is saturated or olefinically unsaturated alkylene.

6. Light-sensitive material as defined in claim 1, wherein G is phenylene.

References Cited

UNITED STATES PATENTS 3,203,799   8/1965   Anderau _____ 96—99
3,211,554   10/1965  Dreyfuss _____ 96—99

J. TRAVIS BROWN, Primary Examiner

U.S. Cl. X.R.

96—20, 53, 84